US012608741B2

(12) United States Patent
Johri et al.

(10) Patent No.: US 12,608,741 B2
(45) Date of Patent: Apr. 21, 2026

(54) METHODS FOR VIRTUAL FITTING USING NON-PROPRIETARY USER INFORMATION FOR IMPROVED PRIVACY

(71) Applicant: Mast Industries (Far East) Limited, Kowloon (HK)

(72) Inventors: Vidith Johri, Lucknow (IN); Vrinda Hotwani, Ahmedabad (IN); Lav Patel, Ahmedabad (IN); Eugene Quaye, Canal Winchester, OH (US)

(73) Assignee: Mast Industries (Far East) Limited, Kowloon Bay (HK)

( * ) Notice: Subject to any disclaimer, the term of this patent is extended or adjusted under 35 U.S.C. 154(b) by 264 days.

(21) Appl. No.: 18/333,645

(22) Filed: Jun. 13, 2023

(65) Prior Publication Data

US 2024/0420225 A1 Dec. 19, 2024

(51) Int. Cl.
*G06Q 30/0601* (2023.01)
*G06T 17/20* (2006.01)

(52) U.S. Cl.
CPC ......... *G06Q 30/0643* (2013.01); *G06T 17/20* (2013.01)

(58) Field of Classification Search
CPC ................................................. G06Q 30/0643
See application file for complete search history.

(56) References Cited

U.S. PATENT DOCUMENTS 8,818,883 B2 8/2014 Lawrence et al.
9,189,886 B2 11/2015 Black et al.

9,665,906 B2 5/2017 Adeyoola et al.
9,754,410 B2 9/2017 Hua et al.
9,881,334 B2 1/2018 Adeyoola et al.
9,905,019 B2 2/2018 Applegate et al.
(Continued)

FOREIGN PATENT DOCUMENTS

KR 10-1178443 B1 8/2012
KR 10-2012-0121030 A 11/2012
(Continued)

OTHER PUBLICATIONS

Sun, Y., Yick, K. L., Yu, W., Chen, L., Lau, N., Jiao, W., & Zhang, S. (2019). 3D bra and human interactive modeling using finite element method for bra design. Computer-Aided Design, 114, 13-27. (Year: 2019).*
(Continued)

*Primary Examiner* — Michael Misiaszek
(74) *Attorney, Agent, or Firm* — Andrus Intellectual Property Law, LLP

(57) ABSTRACT

A method is disclosed for providing a user with the ability to try on a garment virtually. The method is carried out by a processor and comprises: scaling a base model depending on a brassiere band size and a brassiere cup size of the user; rendering a garment on the scaled base model by superimposing a base product mesh on the scaled base model and mapping the base product mesh to an image of the garment; calculating a fit value of the base product mesh on the scaled base model by calculating distances between predefined reference points on a skin of the scaled base model and corresponding predefined reference points on an inside face of the base product mesh; and comparing the calculated fit value to an ideal fit value and providing feedback to the user based on the comparison.

20 Claims, 10 Drawing Sheets

(56) References Cited

U.S. PATENT DOCUMENTS

| | | | |
|---|---|---|---|
| 9,959,569 B2 | 5/2018 | Adeyoola et al. | |
| 10,002,460 B2 | 6/2018 | Black et al. | |
| 10,013,713 B2 | 7/2018 | Adeyoola et al. | |
| 10,121,189 B2 | 11/2018 | Adeyoola et al. | |
| 10,134,083 B2 | 11/2018 | Adeyoola et al. | |
| 10,140,652 B2 | 11/2018 | Adeyoola et al. | |
| 10,157,416 B2 | 12/2018 | Adeyoola et al. | |
| 10,242,498 B1 | 3/2019 | Leong et al. | |
| 10,290,136 B2 | 5/2019 | Kristal et al. | |
| 10,339,706 B2 | 7/2019 | Black et al. | |
| 10,354,453 B2 | 7/2019 | Ngoc et al. | |
| 10,373,373 B2 | 8/2019 | Leong et al. | |
| 10,430,867 B2 | 10/2019 | Mitchell et al. | |
| 10,475,099 B1 | 11/2019 | Nomula et al. | |
| 10,489,955 B2 | 11/2019 | Kristal et al. | |
| 10,534,809 B2 | 1/2020 | Wiesel et al. | |
| 10,546,417 B2 | 1/2020 | Black et al. | |
| 10,546,433 B2 | 1/2020 | Lin et al. | |
| 10,621,779 B1* | 4/2020 | Topiwala | G06F 18/253 |
| 10,706,262 B2 | 7/2020 | Makeev et al. | |
| 10,740,941 B2 | 8/2020 | Kristal et al. | |
| 10,777,020 B2 | 9/2020 | Aluru et al. | |
| 10,777,021 B2 | 9/2020 | Aluru et al. | |
| 10,777,022 B2 | 9/2020 | Jeon | |
| 10,789,774 B2 | 9/2020 | Oh | |
| 10,872,475 B2 | 12/2020 | Aluru et al. | |
| 10,922,898 B2 | 2/2021 | Aluru et al. | |
| 10,964,078 B2 | 3/2021 | Wiesel et al. | |
| 10,970,939 B2 | 4/2021 | Jeon | |
| 11,094,115 B2 | 8/2021 | Ju | |
| 11,132,833 B2 | 9/2021 | Fedyukov et al. | |
| 11,158,121 B1 | 10/2021 | Tung et al. | |
| 11,164,240 B2 | 11/2021 | Mitchell et al. | |
| 11,227,008 B2 | 1/2022 | Wiesel et al. | |
| 11,250,639 B2 | 2/2022 | Santesteban et al. | |
| 11,321,916 B1* | 5/2022 | Zhang | G06T 19/00 |
| 2011/0295711 A1* | 12/2011 | Mazmanyan | G06Q 30/0631 |
| | | | 705/26.7 |
| 2013/0057544 A1 | 3/2013 | Oh | |
| 2013/0083065 A1 | 4/2013 | Schulze | |
| 2017/0140574 A1* | 5/2017 | Sugita | G06T 19/20 |
| 2019/0035149 A1* | 1/2019 | Chen | G06V 40/166 |
| 2019/0304200 A1* | 10/2019 | Jeon | G06T 19/20 |
| 2020/0151807 A1* | 5/2020 | Zhou | G06V 10/454 |
| 2021/0049811 A1* | 2/2021 | Fedyukov | G06T 7/60 |
| 2021/0217237 A1 | 7/2021 | Lee et al. | |
| 2022/0157020 A1* | 5/2022 | Kang | G06T 17/205 |
| 2022/0215224 A1* | 7/2022 | Sareen | G06Q 30/0621 |
| 2022/0319140 A1* | 10/2022 | Wu | G06T 17/205 |
| 2023/0252747 A1* | 8/2023 | Meador | G06T 9/002 |
| | | | 345/419 |
| 2024/0202931 A1* | 6/2024 | Lu | G06T 7/62 |
| 2024/0320917 A1* | 9/2024 | Saito | G06T 17/20 |

FOREIGN PATENT DOCUMENTS

| | | | |
|---|---|---|---|
| WO | 2018052367 A1 | 3/2018 | |
| WO | 2020098418 A1 | 5/2020 | |
| WO | 2020104990 A1 | 5/2020 | |

OTHER PUBLICATIONS

Finite element modeling of bra fitting Y. Cai, W. Yu, L. Chen. The Hong Kong Polytechnic University, Hong Kong, China; Beijing University of Technology, Beijing, People's Republic of China (Year: 2016).*

Style.me, "3D Virtual Fitting and Styling," web page, admitted prior art, available at https://style.me/virtual-fitting/, last accessed Jun. 13, 2023.

Fitle, "Stop losing sales because your consumers are doubting their size," web page, admitted prior art, available at https://www.fitle.com/en/, last accessed Jun. 13, 2023.

Fadelli, Ingrid, "DeepDraper: A technique that predicts how clothes would look on different people," web article on Tech Xplore, Oct. 26, 2021, available at https://techxplore.com/news/2021-10-deepdraper-technique-people.html, last accessed Jun. 13, 2023.

AstraFit, "Grow your business with personalized AstraFit recommendations," web page, admitted prior art, available at https://www.astrafit.com/how-it-works, last accessed Jun. 13, 2023.

CLO Virtual Fashion LLC, "Changing the world with virtual garments," web page, admitted prior art, available at https://www.clo3d.com/en/, last accessed Jun. 13, 2023.

TriMirror, "uDraper Unreal Engine real-time cloth simulation plugin and 3D clothes designer," web page, admitted prior art, available at https://www.trimirror.com/, last accessed Jun. 13, 2023.

Patel et al., "TailorNet: Predicting clothing in 3D as a function of human pose, shape, and garment style," web article, 2020, available at https://virtualhumans.mpi-inf.mpg.de/tailornet/, last accessed Jun. 13, 2023.

3DLook Inc., "YourFit," web page, admitted prior art, available at https://3dlook.me/yourfit/, last accessed Jun. 13, 2023.

Zeekit, "Try It on, Virtually," web page, admitted prior art, available at https://zeekit.me/, last accessed Jun. 13, 2023.

Pijak, Jana, "Avametric Specializes in App Development and Virtual E-Commerce Services," web article on TrendHunter, Nov. 12, 2018, available at https://www.trendhunter.com/trends/avametric, last accessed Jun. 13, 2023.

* cited by examiner

3D KEYPOINTS AND THEIR SPECIFICATION

0-BOTTOM TORSO
1-LEFT HIP
2-LEFT KNEE
3-LEFT FOOT
4-RIGHT HIP
5-RIGHT KNEE
6-RIGHT FOOT
7-CENTER TORSO
8-UPPER TORSO

9-NECK BASE
10-CENTER HEAD
11-RIGHT SHOULDER
12-RIGHT ELBOW
13-RIGHT HAND
14-LEFT SHOULDER
15-LEFT ELBOW
16-LEFT HAND

502 —— CREATE AVATAR BASED ON BODY SIZE

504 —— SELECT BASE MODEL FROM ASSET LIBRARY ACCORDING TO CATEGORY SELECTED

506 —— APPLY SAVED BODY SIZE AND RENDER THE MODEL ON WEBSITE

508 —— REPLACE THE MATERIAL MESH ON THE MODEL DEPENDING ON SELECTION

510 —— RENDER THE NEW MATERIAL ON THE BASE MODEL

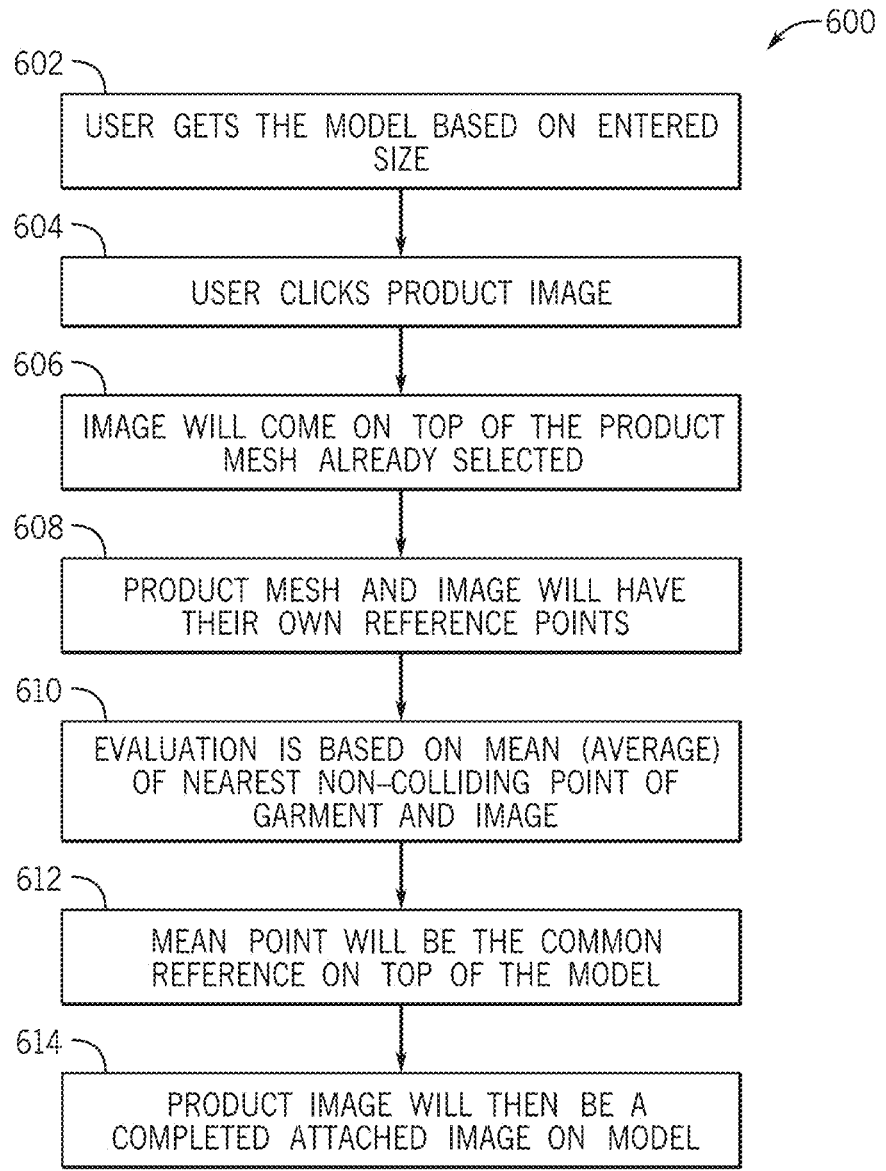

602 — USER GETS THE MODEL BASED ON ENTERED SIZE

604 — USER CLICKS PRODUCT IMAGE

606 — IMAGE WILL COME ON TOP OF THE PRODUCT MESH ALREADY SELECTED

608 — PRODUCT MESH AND IMAGE WILL HAVE THEIR OWN REFERENCE POINTS

610 — EVALUATION IS BASED ON MEAN (AVERAGE) OF NEAREST NON-COLLIDING POINT OF GARMENT AND IMAGE

612 — MEAN POINT WILL BE THE COMMON REFERENCE ON TOP OF THE MODEL

614 — PRODUCT IMAGE WILL THEN BE A COMPLETED ATTACHED IMAGE ON MODEL

FIG. 6

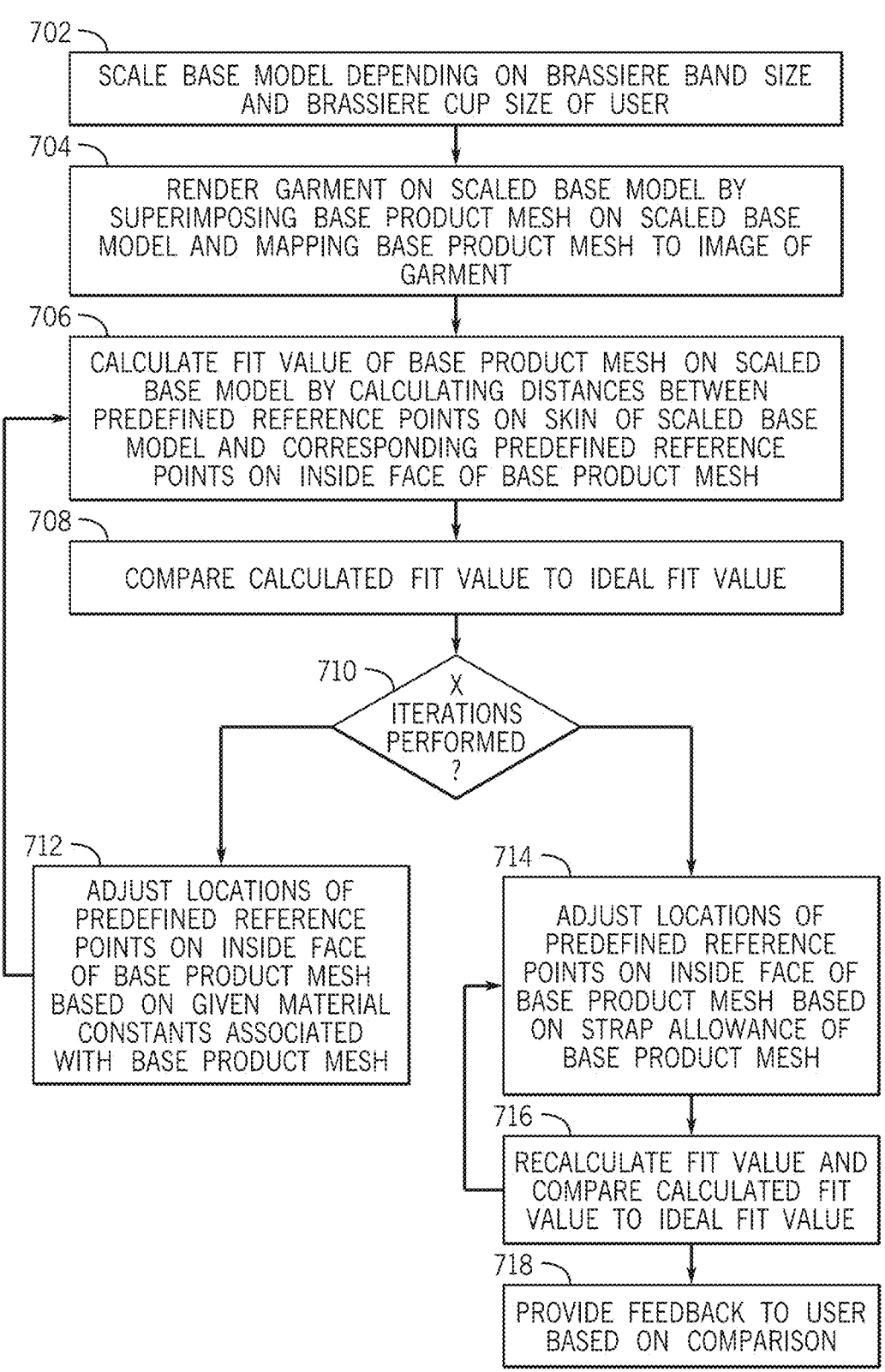

702 — SCALE BASE MODEL DEPENDING ON BRASSIERE BAND SIZE AND BRASSIERE CUP SIZE OF USER

704 — RENDER GARMENT ON SCALED BASE MODEL BY SUPERIMPOSING BASE PRODUCT MESH ON SCALED BASE MODEL AND MAPPING BASE PRODUCT MESH TO IMAGE OF GARMENT

706 — CALCULATE FIT VALUE OF BASE PRODUCT MESH ON SCALED BASE MODEL BY CALCULATING DISTANCES BETWEEN PREDEFINED REFERENCE POINTS ON SKIN OF SCALED BASE MODEL AND CORRESPONDING PREDEFINED REFERENCE POINTS ON INSIDE FACE OF BASE PRODUCT MESH

708 — COMPARE CALCULATED FIT VALUE TO IDEAL FIT VALUE

710 — X ITERATIONS PERFORMED ?

712 — ADJUST LOCATIONS OF PREDEFINED REFERENCE POINTS ON INSIDE FACE OF BASE PRODUCT MESH BASED ON GIVEN MATERIAL CONSTANTS ASSOCIATED WITH BASE PRODUCT MESH

714 — ADJUST LOCATIONS OF PREDEFINED REFERENCE POINTS ON INSIDE FACE OF BASE PRODUCT MESH BASED ON STRAP ALLOWANCE OF BASE PRODUCT MESH

716 — RECALCULATE FIT VALUE AND COMPARE CALCULATED FIT VALUE TO IDEAL FIT VALUE

718 — PROVIDE FEEDBACK TO USER BASED ON COMPARISON

FIG. 7

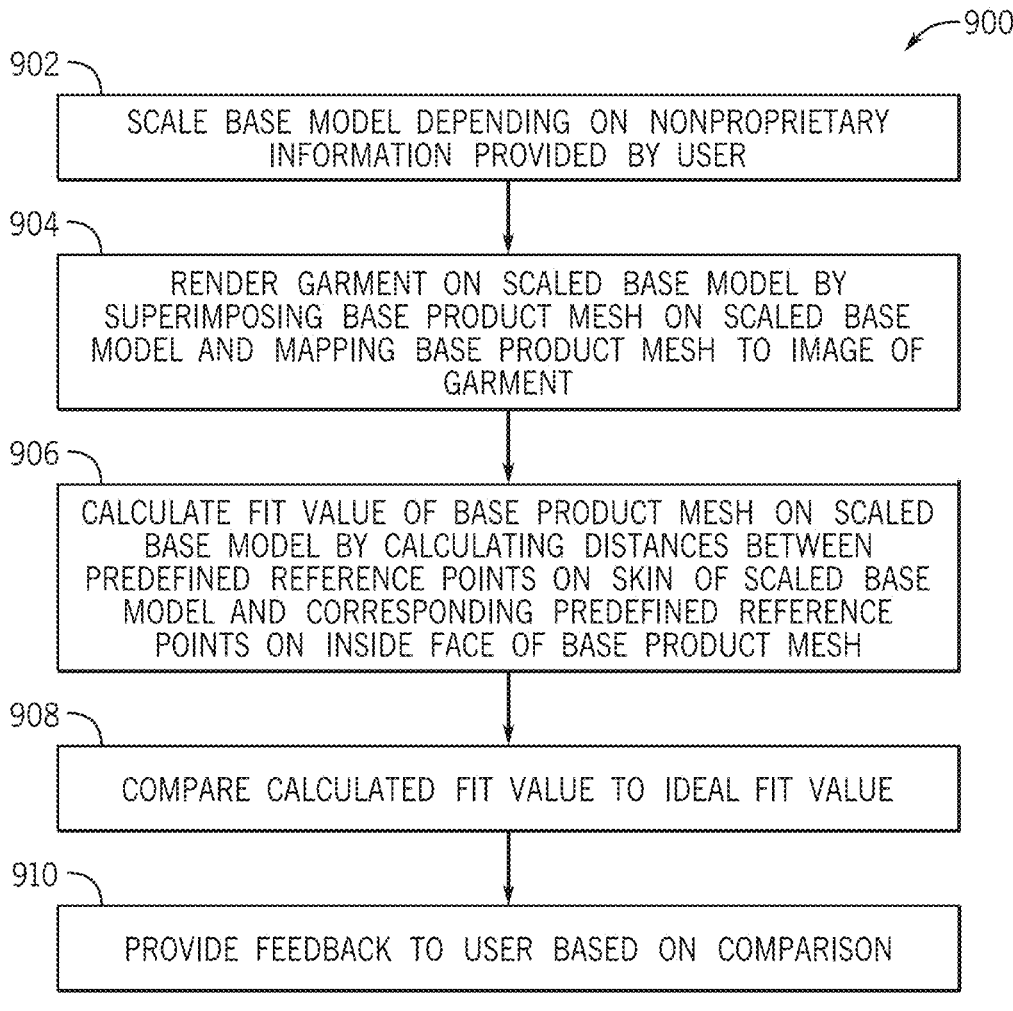

902

SCALE BASE MODEL DEPENDING ON NONPROPRIETARY INFORMATION PROVIDED BY USER

904

RENDER GARMENT ON SCALED BASE MODEL BY SUPERIMPOSING BASE PRODUCT MESH ON SCALED BASE MODEL AND MAPPING BASE PRODUCT MESH TO IMAGE OF GARMENT

906

CALCULATE FIT VALUE OF BASE PRODUCT MESH ON SCALED BASE MODEL BY CALCULATING DISTANCES BETWEEN PREDEFINED REFERENCE POINTS ON SKIN OF SCALED BASE MODEL AND CORRESPONDING PREDEFINED REFERENCE POINTS ON INSIDE FACE OF BASE PRODUCT MESH

908

COMPARE CALCULATED FIT VALUE TO IDEAL FIT VALUE

910

PROVIDE FEEDBACK TO USER BASED ON COMPARISON

FIG. 9

[open application window]

METHODS FOR VIRTUAL FITTING USING NON-PROPRIETARY USER INFORMATION FOR IMPROVED PRIVACY

FIELD

The present disclosure relates to computer-implemented methods for providing a user with the ability to try on a garment virtually.

BACKGROUND

U.S. Pat. No. 10,922,898 discloses techniques for apparel simulation. For example, processing circuitry may determine a body construct used for generating a shape of a virtual representation of a user, determine that one or more points on a virtual apparel are within the body construct, and determine, for each of the one or more points, a respective normal vector. Each respective normal vector intersects each respective point and is oriented towards the body construct. The processing circuitry may also extend each of the one or more points to corresponding points on the body construct based on each respective normal vector and generate graphical information of the virtual apparel based on the extension of each of the one or more points to the corresponding points on the body construct.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure is of a method for providing a user with the ability to try on a garment virtually. The method is carried out by a processor and comprises: scaling a base model depending on a brassiere band size and a brassiere cup size of the user; rendering a garment on the scaled base model by superimposing a base product mesh on the scaled base model and mapping the base product mesh to an image of the garment; calculating a fit value of the base product mesh on the scaled base model by calculating distances between predefined reference points on a skin of the scaled base model and corresponding predefined reference points on an inside face of the base product mesh; and comparing the calculated fit value to an ideal fit value and providing feedback to the user based on the comparison.

Another example of the present disclosure is of a method for providing a user with the ability to try on a garment virtually, the method being carried out by a processor and comprising: scaling a base model depending on a brassiere band size and a brassiere cup size of the user; rendering a garment on the scaled base model by superimposing a product mesh on the scaled base model; calculating a fit value of the product mesh on the scaled base model by calculating distances between predefined reference points on a skin of the scaled base model and corresponding predefined reference points on an inside face of the product mesh; and comparing the calculated fit value to an ideal fit value and providing feedback to the user based on the comparison.

Another example of the present disclosure is of a method for providing a user with the ability to try on a garment virtually, the method being carried out by a processor and comprising: scaling a base model depending on non-proprietary information provided by the user; rendering a garment on the scaled base model by superimposing a base product mesh on the scaled base model and mapping the base product mesh to an image of the garment; calculating a fit value of the base product mesh on the scaled base model by calculating distances between predefined reference points on a skin of the scaled base model and corresponding predefined reference points on an inside face of the base product mesh; and comparing the calculated fit value to an ideal fit value and providing feedback to the user based on the comparison.

BRIEF DESCRIPTION OF THE DRAWINGS

Examples of virtual fitting room applications are described with reference to the following Figures. The same numbers are used throughout the Figures to reference like features and like components.

FIG. 6 illustrates an algorithm for mapping a product mesh onto a garment image.

FIG. 7 shows a method for calculating a fit value of the garment on the avatar and comparing the fit value to an ideal fit value.

FIG. 9 shows another method according to the present disclosure.

DETAILED DESCRIPTION

Figure 1:
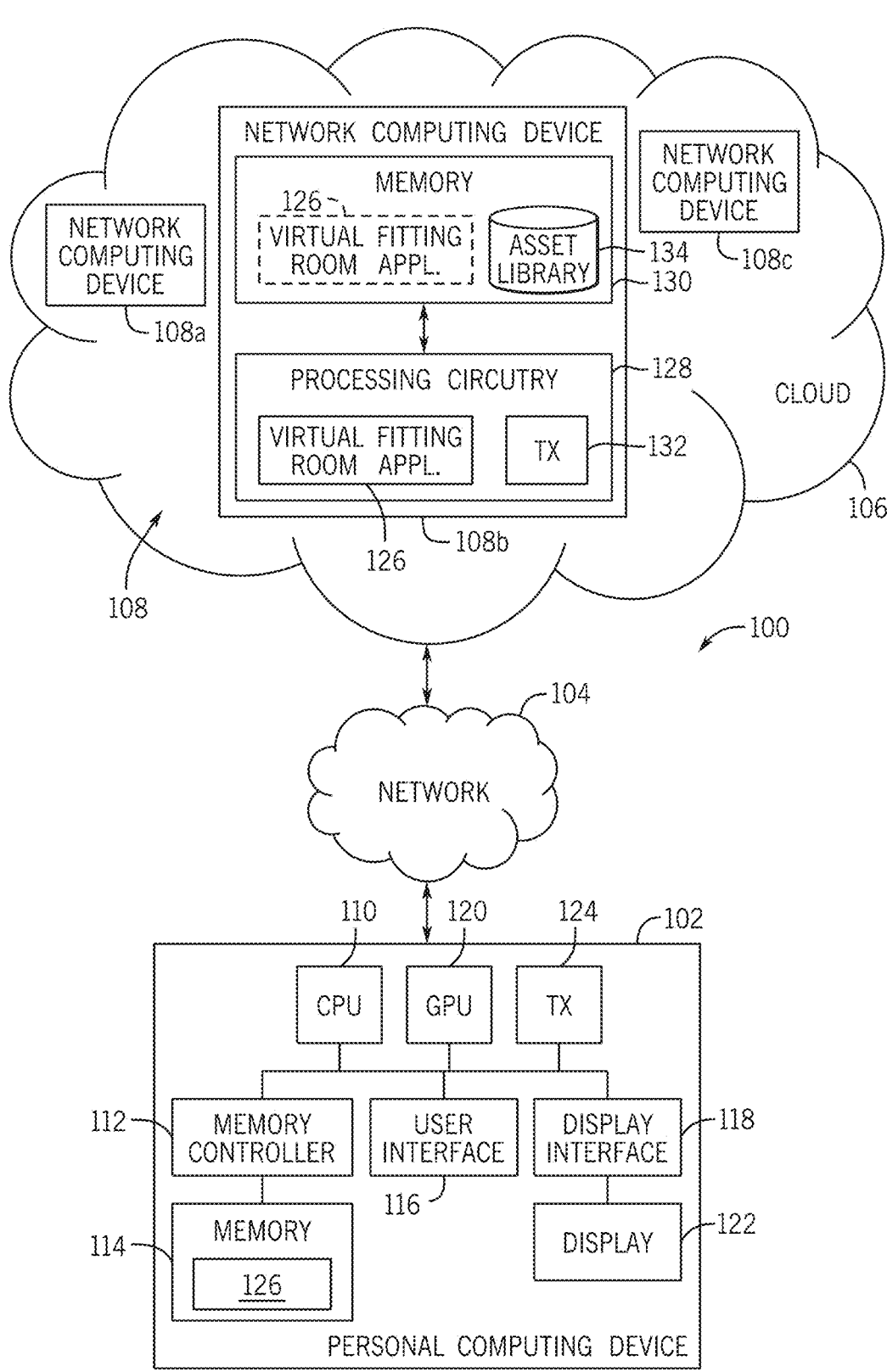
FIG. 1 is a block diagram illustrating a system for creating virtual representations of users and trying on garments virtually according to example algorithms disclosed herein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C.

Existing websites allow a user to try on different apparel virtually on an avatar that is a virtual representation of the user. To virtually try on apparel means the user is able to view how a virtual representation of a garment would look when worn by a virtual representation of the user. Often, the user must provide an electronic representation (e.g., photograph or video) to be used in creating the avatar and/or must provide their physical characteristics and/or measurements. Users may be hesitant to share their real images and associated physical characteristics and/or measurements due to privacy concerns and/or concerns of potential misuse of such information. In contrast, the virtual fitting room application of the present disclosure provides a way to associate only a user's physical characteristics, non-proprietary information, and/or measurements with the user's profile, which gives some level of privacy assurance to the user. This disclosure further discusses how the user's physical characteristics and/or measurements may be used to filter the products accessible by the user, thereby minimizing the number of selectable products and maximizing the chance the user purchases a product. Moreover, websites that require the user's image create avatars with facial features drawn from the user's image and therefore must create many different avatars with various different retail apparel to allow for maximized selection availability. The algorithms of this disclosure, in contrast, reduce the number of avatars needed to provide the same maximized selection availability.

This disclosure describes methods that allow a user to create a 3D human avatar (i.e., virtual representation of the user) and try on different selected clothing products virtually, without requiring the user to share an image of themselves. For example, the user can choose or enter specific bodily characteristics and/or measurements, which are translated to a representative avatar, which avatar is then stored electronically and associated with the user's profile. Thereafter, the stored avatar is electronically displayed on the user's display screen and the user can select garments to be shown on the avatar in varied stationary and non-stationary poses.

FIG. 1 is a block diagram illustrating a system 100 for creating virtual representations of users and trying on garments virtually according to example algorithms disclosed herein. As illustrated, system 100 includes personal computing device 102, network 104, and cloud 106. Cloud 106 includes network computing devices 108a-c (together network computing devices 108).

Examples of personal computing device 102 include mobile computing devices (e.g., tablets or smartphones), laptop or desktop computers, e-book readers, video game devices, a personal digital assistant (PDA), a television, and the like. In one example, a user of personal computing device 102 may access an online retailer's website in order to launch the virtual fitting room application 126 disclosed herein. The personal computing device 102 includes a central processing unit (CPU) 110, memory controller 112 that provides access to system memory 114, user interface 116, and display interface 118 with associated graphics processing unit (GPU) 120 and display 122. Personal computing device 102 also includes transceiver 124, which may include wired or wireless communication links, to communicate with network 104. In some examples, the above-noted components may be combined to form a system on chip (SoC). The CPU 110 may be any means configured to execute various programmed operations or instructions stored in the system memory 114 such as a device or circuitry operating in accordance with software or otherwise embodied in hardware or a combination of hardware and software (e.g., a processor operating under software control or the processor embodied as an application specific integrated circuit (ASIC), field programmable gate array (FPGA), or other equivalent integrated or discrete logic circuitry specifically configured to perform the operations described herein, or a combination thereof) thereby configuring the device or circuitry to perform the corresponding functions of the CPU 110 as described herein.

A user may provide input to personal computing device 102 to cause CPU 110 to execute one or more software applications, for example, a virtual fitting room application 126, as described in more detail herein below. The user may provide input to personal computing device 102 via one or more input devices (not shown) such as a keyboard, a mouse, a microphone, a touch pad or another input device that is coupled to personal computing device 102 via user interface 116. In some examples, user interface 116 may be part of display 122 (e.g., touch screen). Display 122 may be integrated within personal computing device 102 or may be a stand-alone device coupled to personal computing device 102 via a wired or wireless communications link.

Memory controller 112 facilitates the transfer of data going into and out of system memory 114. System memory 114 may store program modules and/or instructions and/or data that are accessible by CPU 110 and GPU 120. For example, system memory 114 may store user applications (e.g., virtual fitting room application 126), rendered image content from GPU 120, etc. System memory 114 can comprise any storage media readable by the CPU 110 and capable of storing software. The system memory 114 can include volatile and non-volatile, removable and non-removable media implemented in any method or technology for storage of information, such as computer-readable instructions, data structures, software modules, or other data. The CPU 110 loads and executes software from the system memory 114, such as software programmed with a virtual fitting room algorithm, which directs the CPU 110 to operate as described herein below in further detail.

As noted, one example of the software application that CPU 110 executes is virtual fitting room application 126. The user may see a thumbnail indication of virtual fitting room application 126 on display 122, and when the user wants to interact with virtual fitting room application 126, the user selects (e.g., clicks on, touches) the thumbnail to execute virtual fitting room application 126 on CPU 110.

As is typical, personal computing device 102 relies on the memory and processing power of network computing devices 108 within cloud 106 to execute the virtual fitting room application 126. Cloud 106 represents a cloud infrastructure that supports multiple network computing devices 108 on which applications or operations requested by one or more users run. For example, cloud 106 provides cloud computing for using network computing devices 108, hosted on network 104, to store, manage, and process data, rather than personal computing device 102. Network 104 may transport data between network computing devices 108 and personal computing device 102. For example, network 104 may form part of a global network such as the Internet or a content delivery network (CDN). Examples of network computing devices 108 include server devices that provide functionality to personal computing device 102. For example, network computing devices 108 may share data or resources for performing computations for personal computing device 102. Network computing devices 108 may be a combination of computing servers, web servers, database servers, and the like.

In one example, network computing devices 108 may host virtual fitting room application 126, executable on processing circuitry 128, via which network computing devices 108 receive body size and garment selection input by a user via personal computing device 102. The processing circuitry 128 encompasses the processing circuitry of one or more of network computing devices 108 that together perform the algorithms described in this disclosure. The processing circuitry 128 of network computing devices 108 may render the selected garment on an avatar created by the user, as well as determine whether the selected garment is an ideal fit for the user.

Each network computing device, such as exemplary network computing device 108b in FIG. 1, includes processing circuitry 128 and memory 130, which may be distributed across one or more of network computing devices 108 within cloud 106. Processing circuitry 128 is illustrated as executing virtual fitting room application 126. Transceiver 132 is circuitry with which processing circuitry 128 receives and transmits information. Memory 130 stores asset library 134, which includes base models, base product meshes, and garment images, as will be described further below. Although memory 130 is shown as being on a single network computing device 108b, it may be possible that different network computing devices 108 each store some of the information shown to be stored in memory 130.

Processing circuitry 128 may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Memory 130 can include volatile and non-volatile, removable and non-removable media implemented in any method or technology for storage of information, such as computer-readable instructions, data structures, software modules, or other data.

Processing circuitry 128 may include arithmetic logic units (ALUs), elementary function units (EFUs), digital circuits, analog circuits, and/or programmable cores, formed from programmable circuits. In examples where the operations of processing circuitry 128 are performed using software executed by the programmable circuits, memory 130 may store the object code of the software that processing circuitry 128 receives and executes. For example, memory 130 may store part or all of the object code for virtual fitting room application 126 that processing circuitry 128 retrieves and executes.

During a preprocessing step, a programmer creates the asset library 134. The asset library 134 stores a plurality of base models, a plurality of base product meshes, and a plurality of garment images.

Figure 10:
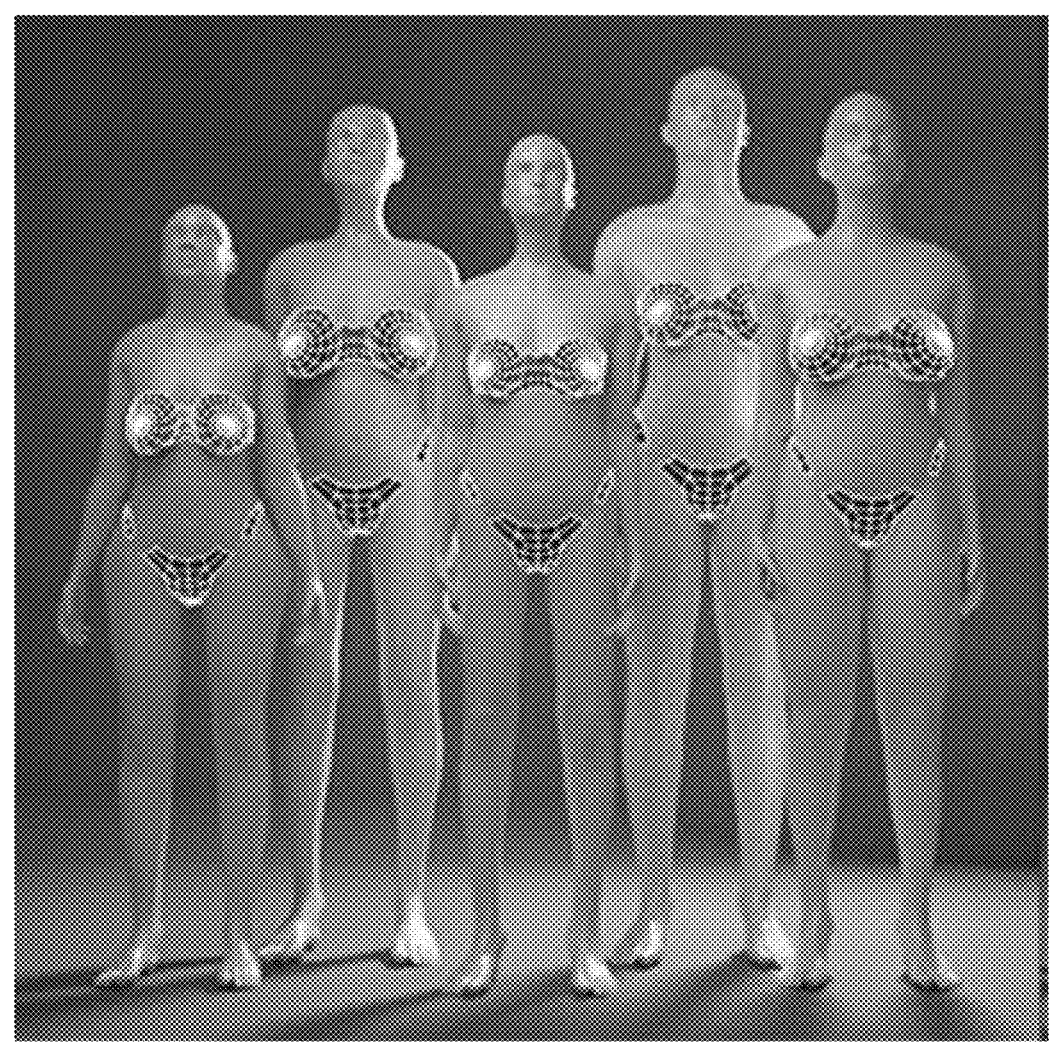
FIG. 10 includes images of exemplary base models.

The plurality of base models includes pre-generated 3D avatars that generally fit the descriptors extra-small, small, medium, large, and extra-large. This list is not exhaustive, and additional sizes of base models can be created and stored in the asset library 134. The avatars that serve as the base models can be created using 3D modeling software, one non-limiting example of which is BLENDER™. Other modeling software such as UNITY™ or UNREAL ENGINE™ could be used to create the avatars. Non-limiting examples of base models of varying sizes are shown in FIG. 10.

Figure 11:
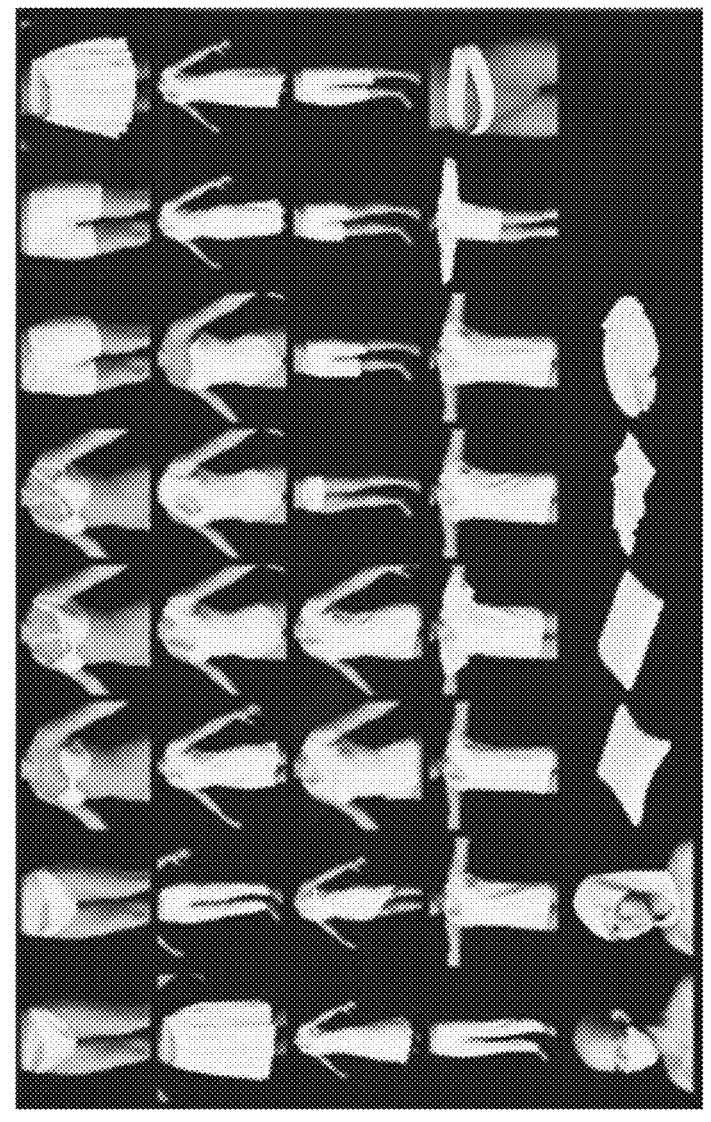
FIG. 11 includes images of exemplary base product meshes.

A mesh generally refers to a virtual 3D structure defined, for example, by a set of data points in a virtual 3D space. Each base product mesh may be, for example, a file stored in the asset library 134. Base product meshes may, for example, be created from CAD/CAM (dxf) files and may include meta-tags that store certain parameters. The parameters may, for example, include information regarding the elasticity, material thickness, and material texture for the mesh, which are some examples of material constants to be described further herein below. The plurality of base product meshes includes meshes for products such as brassieres, panties, t-shirts, leggings, etc. Again, this list is not exhaustive, and base meshes for additional products can be created, such as the base product meshes shown in FIG. 11. In one example, each type of product (brassiere, t-shirt, etc.) has one base product mesh associated therewith, and the base product mesh is scaled on the x-, y-, and z-axes based on the size of the garment selected by the user. The base product meshes can also be created using 3D modeling software, one non-limiting example of which is SIMPLY CLOTH™.

The asset library 134 further stores a plurality of images (e.g., photographs) of real garments that are available for selection. These photographs show the real products (i.e., a physical product a user is actually able to purchase) from all angles. The photographs may be taken when the garment is on a model or mannequin such that the base product meshes easily map to the photographs, a process which is described herein below. Each base product mesh has one or more garment images associated therewith. Because a given single base product mesh may represent more than one real garment, a given single base product mesh may have more than one set of images of a real garment associated therewith. Such would be the case if the same garment came in multiple colors and/or materials. For example, the same base product mesh may be associated with a first set of garment images showing the product in a first color and with a second set of garment images showing the product in a second color.

Figure 2:
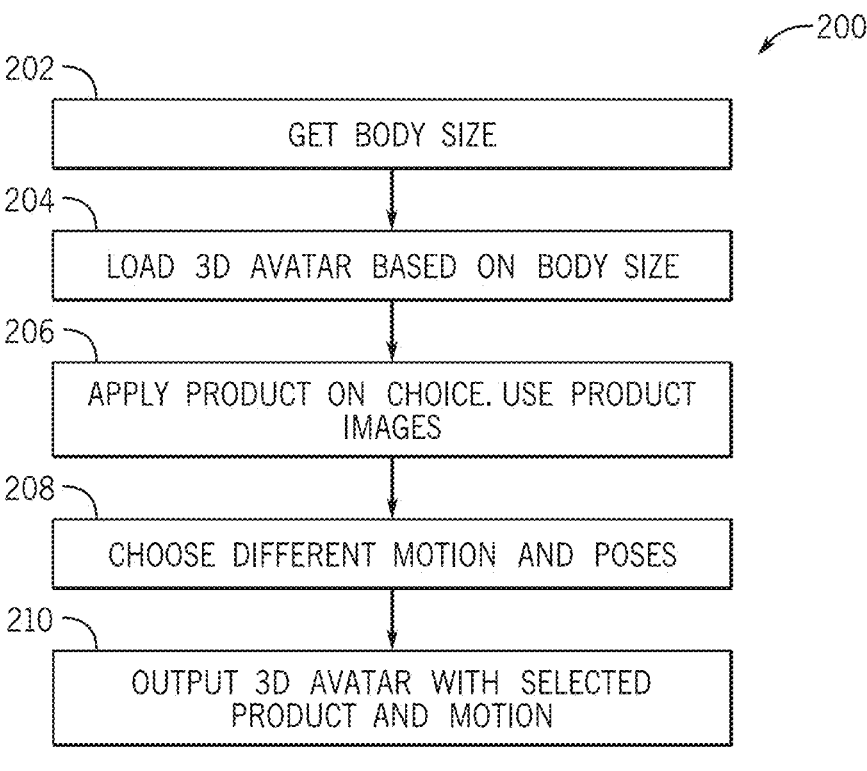
FIG. 2 illustrates logic flow for an exemplary algorithm for rendering an avatar wearing a user-selected garment and posing and moving the avatar.

A diagram showing the overall logic flow for the virtual fitting room application 126 is provided in FIG. 2. The logic 200 includes obtaining the user's body size, as shown at 202. For example, in response to executing virtual fitting room application 126, the user may be prompted, via display 122 or another part of user interface 116, to select a base model. This may include providing a plurality of base models of different sizes from which the user can select a base model, for example such as the user selecting a body size from extra-small to extra-large, as noted hereinabove. This information may be obtained by having the user enter or select a body size descriptor (e.g., the word "medium") or by having the user select an image of an avatar having a body size closest to that of the user. As shown at 204, a 3D avatar is thereafter loaded from the asset library 134 to the user's personal computing device 102 based on the user's entered or selected body size. The user thereafter selects a product (e.g., garment), for example by selecting a thumbnail image of the garment from a menu, and selects a size of the garment. As will be described further herein below, the base product mesh is then scaled based on selected garment size and the scaled base product mesh for that garment is rendered on the avatar and mapped to the product images, as shown at 206. As shown at 208, the user can then choose different motion and/or poses for the avatar, such as by manipulating a mouse or entry to a keypad via the user interface 116. Finally, as shown at 210, the 3D avatar is output on the display 122 with the selected product rendered thereon and in the selected poses and/or moving according to the selected motions.

Figure 3:
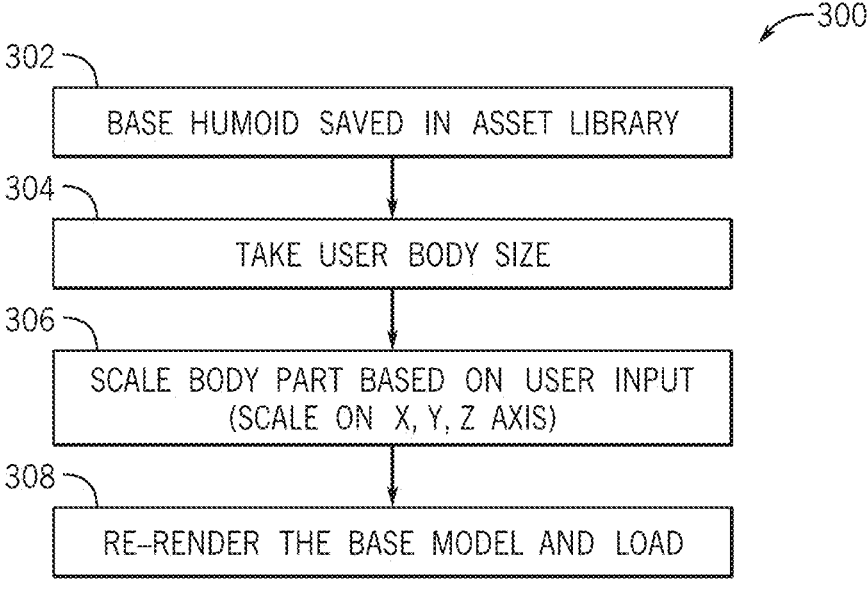
FIG. 3 illustrates logic flow for a subset of the logic flow of FIG. 2 related to selection and scaling of a base model.

FIG. 3 shows a method 300 for rendering a scaled base model, which may be a subroutine related to steps 202 and 204 of FIG. 2. In step 302, a base model saved in the asset library 134 is retrieved. This may be done in response to the user selecting a body size from extra-small to extra-large as described with respect to step 202 in FIG. 2. As noted hereinabove, the base models (see, e.g., FIG. 10) are created by a programmer and represent different sizes of avatars. However, because the categories of small, medium, large, etc. are not enough to encompass all shapes and sizes of users, the logic includes the ability to scale the selected base model to more accurately represent the user's body shape and size. As shown at 304, this includes accepting an additional input as to the user's body size, which input is more specific than simply small, medium, or large. In one example, this includes accepting inputs as to a brassiere band size and a brassiere cup size of the user. The band and cup size can be input freehand by the user or selected from a dropdown/scroll down menu or radio buttons via the user interface 116. In other examples, the band and cup size can be obtained from the user's online profile with the garment retailer. In other examples, the user may also input a waist and/or hip measurement or a pants size. In still other examples, the user may also be able to input their height. As shown at 306, the selected base model is then scaled on the mutually perpendicular x-, y-, and z-axes based on the user's inputted size data.

Figure 4:
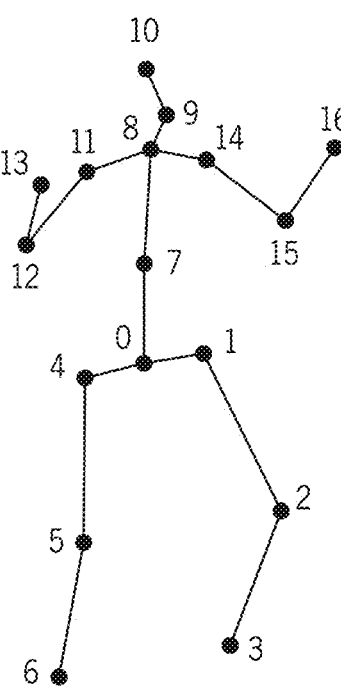
FIG. 4 shows keypoints between which a base model can be scaled based on user input.

FIG. 4 illustrates the 3D keypoints on the base models that are used for scaling the base models dependent on the user's inputted size data in step 306 of FIG. 3. The pre-selected base model (e.g., from extra-small to extra-large) is scaled between each keypoint. For example, if a user inputs a particular band and cup size, the pre-programmed distance between keypoint 8 (upper torso) and keypoint 11 (right shoulder) and the pre-programmed distance between keypoint 8 and keypoint 14 (left shoulder) will be scaled appropriately. If the user inputs their height, the pre-programmed distance between keypoint 8 and keypoint 7 (center torso) and between keypoint 7 and keypoint 0 (bottom torso) may be scaled accordingly, along with the pre-programmed distances between keypoints 4 and 5, keypoints 5 and 6, keypoints 1 and 2, and keypoints 2 and 3. The keypoints shown here are merely exemplary, and fewer or more keypoints could be provided. For example, there may be keypoints corresponding to the base model's pectorals, shoulder blades, hips, glutes, etc.

In further examples, the user may also be prompted to enter a skin tone, hair color, hair type, hair length, eye color, or other defining features via the user interface 116 that will make the avatar look more like the user. The virtual fitting room application 126 uses these inputs to render the avatar on the display 122.

Returning to FIG. 3, after the base model is scaled at step 306, the base model is re-rendered and loaded to the website or application with which the user is interacting via the personal computing device 102, as shown at 308 (corresponding to step 204 in FIG. 2). The virtual fitting room asset is loaded with entry points marked on the 3D base model asset. These entry points are used as marking points to place and displace the user-selected base model. Depending on the body size and measurements selected and/or entered by the user, the scaled base model and default clothing from the asset library 134 will be rendered on the user's display 122. When the user is satisfied with how the size of the scaled base model looks and how the default clothing looks, the user can save the details into the size database and navigate to the retailer's webpage. The base model is thereafter ready to be virtually clothed.

Figure 5:
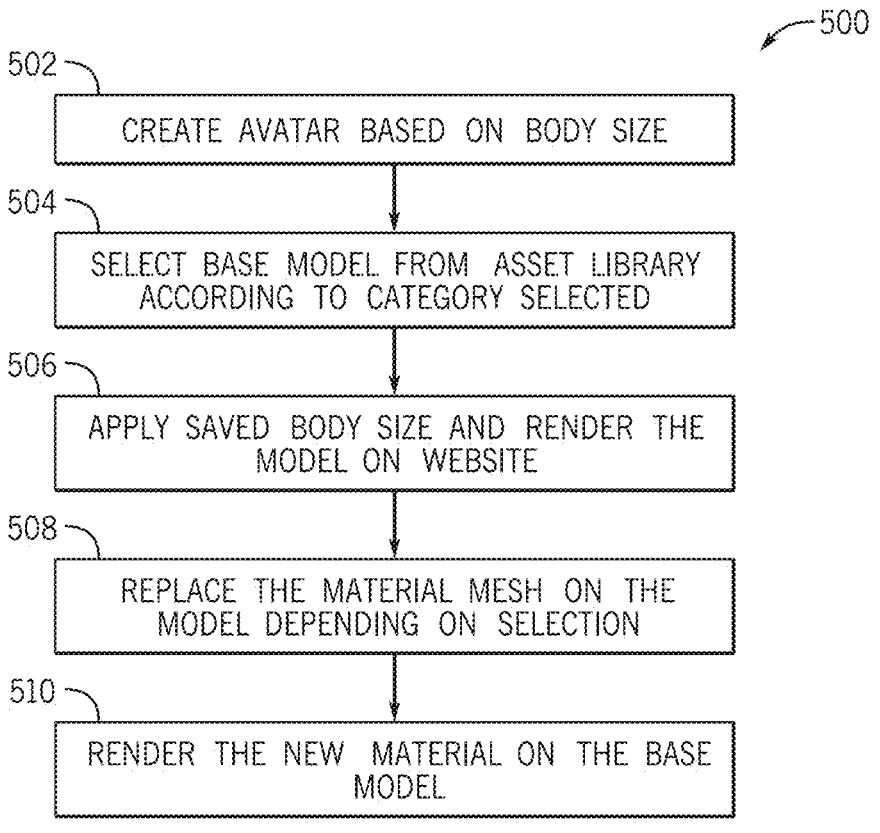
FIG. 5 illustrates an algorithm for rendering a user-selected garment on a user-modified avatar.

FIG. 5 shows a method 500 for product selection according to the present disclosure. At step 502, the programmer creates the base models (avatars) based on body size. The base model is then selected from the asset library 134 based on the user's input/selection, as shown at 504. At 506, the saved body size is applied and the avatar is rendered on the display 122. The base model avatar will initially be shown with default clothing. After the user selects a garment that they wish to try on the avatar, the default material mesh on the scaled base model is replaced depending on the garment selection, as shown at 508. The new material is then rendered on the base model as shown at 510, which includes rendering the garment on the scaled base model by superimposing a base product mesh (obtained from the asset library 134 based on the user's selection of a product) on the scaled base model and mapping the base product mesh to an image or images of the garment (also saved in the asset library 134).

Network computing devices 108 may generate a series of commands and data (e.g., vertices and color information) for how GPU 120 is to render the avatar, and output the commands and data, i.e. graphical information, to personal computing device 102. In one example, as part of step 510, superimposing the base product mesh (which has been scaled based on selected garment size) on the scaled base model comprises matching predefined reference points on the inside face of the base product mesh to corresponding predefined reference points on the skin of the scaled base model. Such predefined reference points are created by the programmer as a reference for where the base product mesh should be positioned on the avatar. With the base product mesh rendered on the scaled base model, the user can check how the garment looks on the avatar and how it fits. In this manner, virtual fitting room application 126 may render the base product mesh on the avatar. The output from processing circuitry 128 may be graphical information of the scaled base model along with the base product mesh (e.g., as a 3D object). Personal computing device 102 receives the output from processing circuitry 128 and GPU 120 renders the avatar with the virtual garment on display 122 for the user to determine the style and fit.

In one example, as part of step 510, mapping the base product mesh to the image(s) of the garment comprises mapping vertices of the base product mesh (defined by the programmer) to the image(s) of the garment saved in the asset library 134. Each base product mesh includes 3D points and connecting edges between those points for defining the 3D structure of the garment. For example, each garment is divided into a mesh of 1 mm by 1 mm by the thickness of the material of the garment. The coordinates of predefined reference points and vertices of the mesh are defined as distances from an origin with a change of 1 mm between each point. Each mesh also has nodes that define the number of materials in the garment, the number of straps in the garment, and the number of layers of materials in the garment. Each base product mesh also includes a material file which holds the material properties of the mesh and information for mapping the product image files to the mesh components to generate a final output of a 3D virtual garment. In one example, based on the texture of each material type, the vertices of the layer are mapped to high definition images of the real product stored in the asset library 134. Each view of the 3D avatar is mapped to an image showing the corresponding view of the product (i.e., front to front, side to side, back to back). For a garment with multiple materials, the texture, shine, and elasticity of each material is applied by changing the RGBA colors of the base garment fitted on the avatar.

FIG. 6 shows a method 600 for mapping a product mesh onto a garment image and rendering the garment on an avatar. At 602, the user is presented with the scaled base model created in response to the user selecting a body size and thereafter entering an additional input related to body size (e.g., cup and band size). At 604, the user selects an image of a product that the user would like to see rendered on their avatar. At 606, the selected image is superimposed over a base product mesh selected based on the type of garment. At 608, predefined reference points on the base product mesh and the selected garment image are compared. At 610, an evaluation is made based on the mean of the nearest non-colliding point on the garment and the image. At 612, the mean point is set as the common reference on top of the scaled base model. At 614, the product image is completely attached to the scaled base model based on this common reference point.

Referring to FIG. 7, the algorithm of the present disclosure therefore includes scaling the base model depending on brassiere band size and brassiere cup size of the user, as shown at 702. The algorithm also includes rendering the garment on the scaled base model by superimposing the base product mesh on the scaled base model and mapping the base product mesh to an image of the garment, as shown at 704. When the garment is tried on, the virtual fitting room application 126 is also able to calculate a fit value of the base product mesh on the scaled base model. This is done by calculating distances between predefined reference points on the skin of the scaled base model and corresponding predefined reference points on the inside face of the base product mesh, as shown at 706. As noted above, these predefined reference points are input by the programmer. There may be hundreds or thousands of predefined reference points (defined by x-, y-, and z-coordinates) on each of the base model's skin and the inside face of the base product mesh. The algorithm may also include comparing the calculated fit value to an ideal fit value (step 708) and providing feedback to the user based on the comparison (step 718). For example, the user may be provided with information via the display 122 that indicates the selected size of the garment is a good fit if the calculated fit value does not deviate from the ideal fit value by more than a given threshold, which threshold may be set by the programmer. Alternatively, the algorithm may include suggesting a different size of the garment to the user in response to the calculated fit value deviating from the ideal fit value by more than the given threshold.

It may be that the initial superimposition of the base product mesh of the garment on the base model does not represent the best fit, but that the actual garment itself will fit the user well based on material constants of the actual garment. For example, if a garment is very stretchy, it may fit a user even if the initial superimposition shows the base product mesh will be too small for the base model. Thus, the algorithm may include adjusting locations of the predefined reference points on the inside face of the base product mesh based on given material constants associated with the base product mesh, as shown at 712. These material constants may be stored in the asset library 134 and associated with each base product mesh. The given material constants may generally relate to the type of material, the sewing of the garment, and whether the garment includes adjustable straps. In one example, the given material constants include at least one of the following aspects of the real garment:

elasticity, material thickness, material texture, wrinkle constant, maximum stretch, minimum stretch, shine, material weight, maximum desired closeness to body, minimum desired closeness to body, maximum closeness of garment layers, minimum closeness of garment layers, seam strength, and material type. The elasticity, material thickness, material texture, wrinkle constant, maximum stretch, minimum stretch, shine, material weight (e.g., in grams per square centimeter), maximum closeness to the body, minimum closeness to the body, maximum closeness of the layers in the garment, and minimum closeness of the layers in the garment are all examples of constants related to the material type, which are indicative of how close the garment is meant to be to the body and how much the garment will stretch when on-body. The constants related to sewing of the garment may include the strength of the sewing (e.g., type of seam, where thicker thread has higher strength and thinner thread has lower strength), pattern of sewing (e.g., straight sewing is strongest while zigzag sewing is durable), sew-ability (e.g., cotton is easy to sew, whereas silk is slippery and lightweight) and the material type of the sewing (e.g., what the thread is made of, which material type can be but is not limited to cotton, nylon, silk, polyester, etc.), which are indicative of how much the garment is able to stretch at the seams. Constants related to adjustable straps include the maximum length of the strap, the minimum length of the strap, a scale ratio, and elongation coordinates. The scale ratio relates to the length by which the strap length increases when the strap slider is adjusted by a given increment. For example, if moving the slider by 1 mm causes the strap length to change by 2 mm, the scale ratio is 2. This scale ratio is used to scale the strap by virtually moving the slider. The elongation coordinates are the maximum and minimum coordinates up to which the slider is permitted to move and are used to constrain the strap slider movement between maximum and minimum coordinates. Each garment has material constants that are unique to that garment stored in association with the garment's base product mesh in the asset library 134. If a garment has multiple layers of material, each layer of material inherits the material constants of its material type.

The above-noted material constants are precalculated based on actual material properties of the garment stored in a database, for example as JavaScript Object Notation (JSON) key/value pairs. In one example, the value of each constant ranges from 0 to 1, with accuracy to three decimal places. By way of non-limiting example with respect to the elasticity constant, a piece of fabric measuring 1 meter that stretches 125 centimeters when a constant force is applied has an elasticity of 0.25 according to the following equation:

$$\text{Elasticity} = (\text{Final Measurement} - \text{Initial Measurement}) / \text{Initial Measurement}. \qquad (\text{Eq. 1})$$

The material constants can have the exemplary values and meanings associated therewith as provided in Table 1 below:

TABLE 1

| | Material Constants | | |
|---|---|---|---|
| Property Name | Value = 0 | Value = 1 | Comments |
| Elasticity | The cloth cannot be stretched without tearing. | The cloth can be stretched when a constant force is applied. | This can be a value between 0 to 1 using Eq. 1. |

TABLE 1-continued

| Material Constants | | | |
|---|---|---|---|
| Property Name | Value = 0 | Value = 1 | Comments |
| Wrinkle constant | The cloth has minimum or no wrinkles. | The cloth has maximum wrinkles. | This can be a value between 0 to 1. |
| Shine | The cloth type is matte (i.e., not shiny). | The cloth type is shiny. | This can be a value between 0 to 1, depending upon the glossiness of the material. |

Each base product mesh representing a garment will have the following information associated therewith: the cloth layer and the cloth layer number. The algorithm is configured to take into account garments that have single or multiple layers of material, multiple types of materials, and multiple straps (which may be adjustable or non-adjustable).

Each base product mesh representing a garment will have also a fit value, as noted hereinabove. For each coordinate of the garment, the distance between the base product mesh and the skin (i.e. the "collision") is calculated while fitting the base product mesh on the scaled base model (see step 706). The fit value is:

$$\text{fit value} = \qquad\qquad (Eq.\ 2)$$

$$\text{average skin collision} * \text{strap adjustment} * \text{wrinkles} * \text{seam pressure}$$

The constants used in the formula of Eq. 2 are defined as:
average skin collision: sum of distance between cloth mesh coordinates and predefined coordinates on the skin/total cloth mesh coordinates (e.g., in mm)
strap adjustment: current length of the strap/minimum length of the strap
wrinkles: average wrinkles per given area (e.g., square cm) of cloth, calculated according to the wrinkle constant of the cloth (If this value is 0, it will not be considered in the fit value formula of Eq. 2.)
seam pressure: average percent scaling of cloth face meshes on either side of a seam, i.e. how much the cloth is stretched on either side of the seam in a particular configuration when compared to the original configuration (If this value is 0, it will not be considered in the fit value formula of Eq. 2.)

Example of Calculation of Ideal Fit Value

A bra B is determined to have a best fit for a configuration Y by bra fitting experts. The following constants will be calculated for the best fitting bra B:
average skin collision: 2 mm
current length of strap: 110 mm
minimum length of strap: 100 mm
strap adjustment: 110/100=1.1
wrinkles: 0.1/cm square
seam pressure: 10%

According to Eq. 2, the ideal fit value = 2 * 1.1 * 0.1 * 10 = 2.2

For all other configurations calculated programmatically, the fit values will be compared with the ideal fit value. The configuration closest to the ideal fit value will be the best fit. Note that because the material constants vary from garment to garment, the ideal fit value will also vary from garment to garment.

In step 712, the algorithm will adjust the points of the base product mesh by scaling and changing the coordinates based on the material constants of each material type in each layer of the garment. The algorithm will thereafter return to step 706 and recalculate the fit value of the base product mesh after adjusting the locations of the predefined reference points on the inside face of the base product mesh. More specifically, the algorithm will iteratively adjust the locations of the predefined reference points on the inside face of the base product mesh based on the given material constants (step 712) and thereafter recalculate the fit value of the base product mesh (step 706), for example, until a given number (e.g., X) iterations of the recalculations have been performed, as determined at 710. This way, the closest configuration to one that would represent a true fit of the garment on the user can be approximated. The algorithm may further include comparing a subset of the recalculated fit values to the ideal fit value. For example, the algorithm may select the 100 best configurations (i.e., configurations in which the fit value is as close to the ideal fit value for that particular garment as possible).

After the predetermined number of iterations is performed as determined at 710, for the 100 selected "best configurations," the algorithm will then continue to step 714 and adjust the locations of the predefined reference points on the inside face of the base product mesh based on a strap allowance of the base product mesh and thereafter recalculate the fit value of the base product mesh at step 716. For example, the strap length may be adjusted from the minimum length in 1-millimeter increments for each iteration until the maximum strap length is reached. For each iteration, the predefined reference points on the garment will also be adjusted, for example, as a point on a bra cup will be lowered in response to lengthening of a strap. The average skin collision will then be recalculated based on the strap variations and the relocated predefined reference points each iteration, and the fit value recalculated thereafter. The fit value that is closest to the ideal fit value is the best fit for the base product mesh on the scaled base model. This information can be provided to the user at 718.

However, as noted above, if the best calculated fit value is not within a threshold of the ideal fit value, the selected size is not ideal for the scaled base model. Dependent on whether the deviation from the ideal fit value is positive or negative, the user may be provided with a suggestion of a different size to try at step 718.

If a calculated best fit is within the threshold of the ideal fit value, the user can be provided via display 122 with the option to add the selected garment in the selected size to their shopping cart. Furthermore, using the size entered and the garment selected for virtual try-on, new products in the same category or a related category can be shown on the display 122 or emailed to the user as suggestions. This allows the browsing experience to be personalized.

Figure 8:
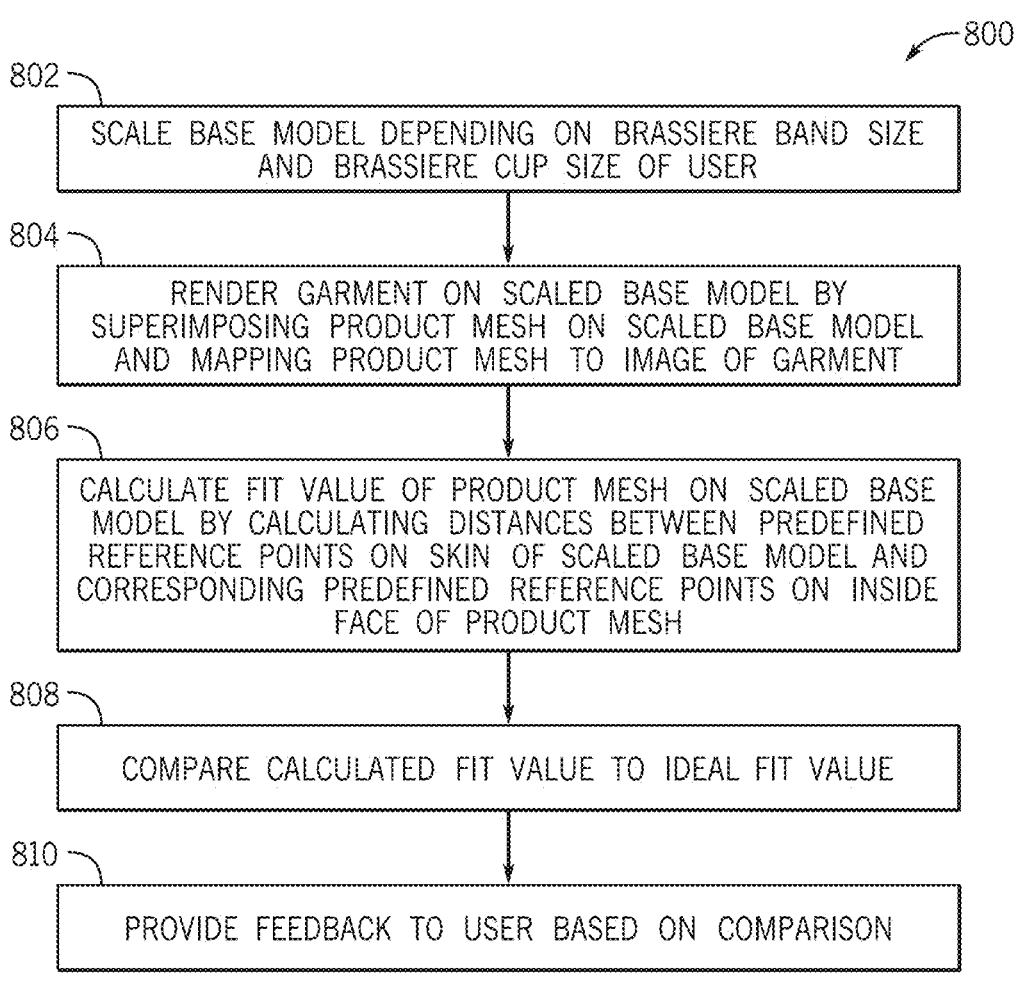
FIG. 8 shows another method according to the present disclosure.

FIG. 8 shows another example of a method 800 for providing a user with the ability to try on a garment virtually. The method 800 is carried out by a processor and comprises scaling a base model depending on a brassiere band size and a brassiere cup size of the user, as shown at 802. The method includes rendering a garment on the scaled base model by superimposing a product mesh on the scaled base model, as shown at 804. Thus, the method differs from that described hereinabove with respect to FIG. 7 in that the product mesh may be one that already has an image of an actual garment mapped to it, or one which was provided with all aspects of the material of the garment (e.g., texture, pattern, color, etc.) when it was first modeled using 3D modeling software. In other examples, the user may not want to see a particular material of the garment, but may simply want to know how a generic garment of a particular size would look on the user's body. The method includes calculating a fit value of the product mesh on the scaled base model by calculating distances between predefined reference points on a skin of the scaled base model and corresponding predefined reference points on an inside face of the product mesh, as shown at 806. The method includes comparing the calculated fit value to an ideal fit value, as shown at 808, and providing feedback to the user based on the comparison, as shown at 810. Aside from step 804, the other steps of the method 800 are the same as those described hereinabove with respect to the method 700 of FIG. 7. The method 800 may also include the iterative steps shown at 710-716.

FIG. 9 shows another example of a method 900 for providing a user with the ability to try on a garment virtually. The method 900 is carried out by a processor and comprises scaling a base model depending on non-proprietary information provided by the user, as shown at 902. In one example, the non-proprietary information is a brassiere band size and a brassiere cup size of the user. Such information is considered non-proprietary, especially on a website that sells brassieres, because a user would be required to enter it at some point during the process of purchasing a brassiere anyhow. Other non-proprietary information might be a panty size, a pants size, a shirt size, an alpha bra size (S, M, L, etc.) or another type of generic information that a user would already be required to enter at some point prior to the point-of-sale. The method includes rendering a garment on the scaled base model by superimposing a base product mesh on the scaled base model and mapping the base product mesh to an image of the garment, as shown at 904. The method includes calculating a fit value of the base product mesh on the scaled base model by calculating distances between predefined reference points on a skin of the scaled base model and corresponding predefined reference points on an inside face of the base product mesh, as shown at 906. The method includes comparing the calculated fit value to an ideal fit value, as shown at 908, and providing feedback to the user based on the comparison, as shown at 910. Aside from step 902, the other steps of the method 900 are the same as those described hereinabove with respect to the method 700 of FIG. 7. The method 900 may also include the iterative steps shown at 710-716.

In the present description, certain terms have been used for brevity, clarity, and understanding. No unnecessary limitations are to be implied therefrom beyond the requirement of the prior art because such terms are used for descriptive purposes only and are intended to be broadly construed. The different systems described herein may be used alone or in combination with other systems. Various equivalents, alternatives, and modifications are possible within the scope of the appended claims.

What is claimed is:

1. A method for providing a user with the ability to try on a garment virtually, the method being carried out by a processor and comprising:

presenting, via a graphical user interface, a plurality of base models of different sizes for selection by a user, wherein each of the plurality of base models is associated with a plurality of predefined reference points, and wherein each of the predefined reference points is associated with a position on a skin of the respective base model;

receiving, via the graphical user interface, a selection of a base model of the plurality of base models;

scaling the base model depending on a brassiere band size and a brassiere cup size of the user, wherein positions of the plurality of predefined reference points are mapped to positions on the skin of the scaled based model based on the scaling of the base model;

presenting, via the graphical user interface, a rendering of the scaled base model;

receiving, via the graphical user interface, a selection of a garment to be virtually tried on;

retrieving a base product mesh for the selected garment, wherein the base product mesh is associated with a plurality of predefined reference points each corresponding to a respective predefined reference point of the plurality of predefined reference points on the skin of the selected base model;

scaling the base product mesh based on a selected garment size;

rendering the selected garment on the scaled base model by superimposing the scaled base product mesh on the scaled base model and mapping the base product mesh to an image of the garment;

presenting, via the graphical user interface, the rendering of the selected garment on the scaled base model to provide qualitative feedback to the user indicative of the fit of the selected garment;

calculating a fit value of the scaled base product mesh on the scaled base model by calculating distances between each predefined reference point of the plurality of predefined reference points on the skin of the scaled base model and corresponding predefined reference points on an inside face of the base product mesh; and comparing the calculated fit value to an ideal fit value and providing, via the graphical user interface, qualitative feedback indicative of the fit of the selected garment to the user based on the comparison.

2. The method of claim 1, further comprising:

adjusting locations of the predefined reference points on the inside face of the base product mesh based on given material constants associated with the base product mesh; and thereafter recalculating the fit value of the base product mesh after adjusting the locations of the predefined reference points on the inside face of the base product mesh.

3. The method of claim 2, wherein the given material constants include at least one of the following aspects of the garment: elasticity, material thickness, material texture, wrinkle constant, maximum stretch, minimum stretch, shine, material weight, maximum desired closeness to body, minimum desired closeness to body, maximum closeness of garment layers, minimum closeness of garment layers, seam strength, and material type.

4. The method of claim 2, further comprising:

iteratively adjusting the locations of the predefined reference points on the inside face of the base product mesh based on the given material constants and thereafter recalculating the fit value of the base product mesh; and comparing a subset of the recalculated fit values to the ideal fit value.

5. The method of claim 2, further comprising adjusting the locations of the predefined reference points on the inside face of the base product mesh based on a strap allowance of the base product mesh and thereafter recalculating the fit value of the base product mesh.

6. The method of claim 1, further comprising providing a plurality of base models of different sizes from which the user can select the base model.

7. The method of claim 1, wherein scaling the base model comprises scaling the base model on mutually perpendicular x-, y-, and z-axes.

8. The method of claim 1, wherein superimposing the base product mesh on the scaled base model comprises matching the predefined reference points on the inside face of the base product mesh to the corresponding predefined reference points on the skin of the scaled base model.

9. The method of claim 1, wherein mapping the base product mesh to an image of the garment comprises mapping vertices of the base product mesh to the image of the garment.

10. The method of claim 1, further comprising suggesting a different size of the garment to the user in response to the calculated fit value deviating from the ideal fit value by more than a given threshold.

11. A method for providing a user with the ability to try on a garment virtually, the method being carried out by a processor and comprising:

receiving, via a graphical user interface, a selection of a base model of a plurality of base models;

scaling the selected base model depending on a brassiere band size and a brassiere cup size of the user;

rendering the scaled base model;

rendering a garment on the scaled base model by superimposing a product mesh on the scaled base model;

providing, via the graphical user interface, qualitative feedback to user using the rendering of the garment on the scaled base model;

calculating a fit value of the product mesh on the scaled base model by calculating distances between each predefined reference point of a plurality of predefined reference points on a skin of the scaled base model and corresponding predefined reference points on an inside face of the product mesh; and comparing the calculated fit value to an ideal fit value and providing, via the graphical user interface, quantitative feedback indicative of the fit of the selected garment to the user based on the comparison.

12. The method of claim 11, further comprising:

adjusting locations of the predefined reference points on the inside face of the product mesh based on given material constants associated with the product mesh; and thereafter recalculating the fit value of the product mesh after adjusting the locations of the predefined reference points on the inside face of the product mesh.

13. The method of claim 12, wherein the given material constants include at least one of the following aspects of the garment: elasticity, material thickness, material texture, wrinkle constant, maximum stretch, minimum stretch, shine, material weight, maximum desired closeness to body, minimum desired closeness to body, maximum closeness of garment layers, minimum closeness of garment layers, seam strength, and material type.

14. The method of claim 12, further comprising:

iteratively adjusting the locations of the predefined reference points on the inside face of the product mesh based on the given material constants and thereafter recalculating the fit value of the product mesh; and comparing a subset of the recalculated fit values to the ideal fit value.

15. The method of claim 12, further comprising adjusting the locations of the predefined reference points on the inside face of the product mesh based on a strap allowance of the product mesh and thereafter recalculating the fit value of the product mesh.

16. A method for providing a user with the ability to try on a garment virtually, the method being carried out by a processor and comprising:

receiving, using a graphical user interface, non-proprietary information from the user;

scaling a base model depending on the non-proprietary information provided by the user;

receiving, via the graphical user interface, a selection of a garment to be virtually tried on;

retrieving a base product mesh for the selected garment, wherein the base product mesh is associated with a plurality of predefined reference points each corresponding to a respective predefined reference point of a plurality of predefined reference points on a skin of the scaled base model;

scaling the base product mesh based on a selected garment size;

rendering a garment on the scaled base model by superimposing the scaled base product mesh on the scaled base model and mapping the base product mesh to an image of the garment;

presenting, via the graphical user interface, the rendering of the selected garment on the scaled base model, thereby providing qualitative feedback to the user indicative of the fit of the selected garment;

calculating a fit value of the scaled base product mesh on the scaled base model by calculating distances between the predefined reference points on the skin of the scaled base model and corresponding predefined reference points on an inside face of the base product mesh; and comparing the calculated fit value to an ideal fit value and providing, via the graphical user interface, quantitative feedback indicative of the fit of the selected garment to the user based on the comparison.

17. The method of claim 16, further comprising presenting, via the graphical user interface, a plurality of base models of different sizes from which the user can select the base model.

18. The method of claim 16, wherein scaling the base model comprises scaling the base model on mutually perpendicular x-, y-, and z-axes.

19. The method of claim 16, wherein superimposing the base product mesh on the scaled base model comprises matching the predefined reference points on the inside face of the base product mesh to the corresponding predefined reference points on the skin of the scaled base model.

20. The method of claim 16, wherein the non-proprietary information is a brassiere band size and a brassiere cup size of the user.

* * * * *